(No Model.)
S. V. KENNEDY.
WHEEL.
No. 383,645. Patented May 29, 1888.
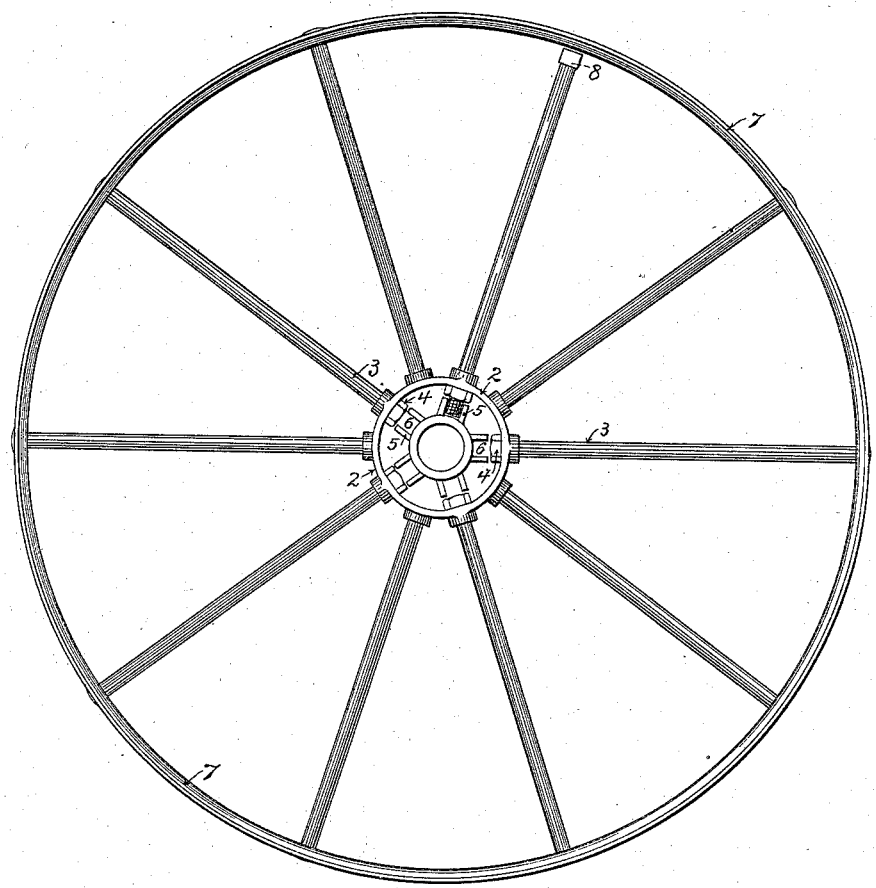
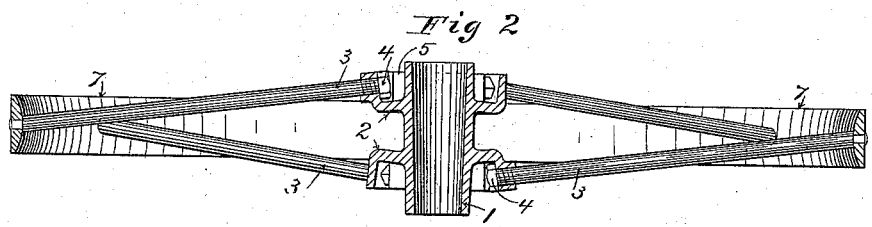
Witnesses.
R. H. Sanford.
Richard Paul
Inventor,
Samuel V. Kennedy
By A. C. Paul
Atty.

UNITED STATES PATENT OFFICE.

SAMUEL V. KENNEDY, OF MINNEAPOLIS, MINNESOTA, ASSIGNOR TO THE MINNEAPOLIS HARVESTER WORKS, OF SAME PLACE.

WHEEL.

SPECIFICATION forming part of Letters Patent No. 383,645, dated May 29, 1888.

Application filed April 3, 1886. Serial No. 197,671. (No model.)

*To all whom it may concern:*

Be it known that I, SAMUEL V. KENNEDY, of Minneapolis, in the county of Hennepin and State of Minnesota, have invented certain Improvements in Wheels, of which the following is a specification.

This invention relates to improvements in wheels that are designed especially for agricultural implements, but are applicable also for general use.

The objects I have in view are to provide a wheel in which the spokes may be given either a tensile or compressing strain by a single nut; also to provide a construction that greatly facilitates the putting together of the wheel and avoids the necessity of an accurate or arbitrary size of the rim to accommodate a certain length of spoke; also to provide wheel-spokes with shouldered ends or tenons to support the rim without upsetting, removing any of the metal, or materially reducing the area of the spoke in cross-section.

To the above ends my invention consists, generally, in the construction hereinafter described, and pointed out in the claim.

In the drawings, forming part of this specification, Figure 1 is a side elevation of a wheel embodying my invention. Fig. 2 is a horizontal cross-section through the center of the same. Figs. 3, 4, and 5 are details of the spoke.

In the drawings, 1 represents the hub of the wheel, which may be formed of wood or metal, preferably of metal.

The hub is formed with a series of radiating holes that receive the spokes. An even number of holes are preferably located alternately near the opposite ends of the hub, so that the spokes are braced against each other. Any convenient number of spokes may, however, be used, and the holes may be located so that the spokes are all in the same plane.

The hub is provided with transverse openings that intercept or extend across the spoke-holes. In these openings suitable nuts are placed, into which the inner screw-threaded ends of the spokes are inserted. The transverse openings are of sufficient size to permit the nuts to be turned to move the spoke in or out; but the nuts are kept from moving either way in the direction of the length of the spokes. I pefer to form these transverse openings by providing the hub with flanges 2 2, through which the spoke-holes extend.

The nuts 4 are placed within the flanges, and the threaded ends of the spokes 3 are passed through the spoke-holes and inserted into the nuts. The outer faces of the nuts are seated against the flanges and their opposite faces are near to or in contact with the outer or upper ends of projections 5. (See Fig. 1.) The spaces 6 between the projections 5 form continuations of the spoke-holes and receive the ends of the spokes when the wheel is being put together.

The spokes are provided with tenons or shouldered ends 8, that are formed by flattening the ends, thereby decreasing the thickness and increasing the width. By this means shoulders are formed on each side of the tenons without removing any of the metal or materially reducing the area in cross-section. The tenons thus formed are oblong in cross-section, and the wheel-rim is provided with oblong holes that receive the tenons.

The tenon-holes are preferably made with their greatest length in the direction of the circumference of the rim to avoid weakening the rim.

To put the wheel together, the spokes are all inserted in the hub with their inner ends in the spaces between the projections 5. The rim is then placed over the spokes, and the nuts 4 are turned, thereby forcing the spokes outward and inserting the tenons into the holes in the rim, so that the shoulders of the tenons bear firmly against the rim. The ends of the tenons, which project through the rim, are riveted against the outside.

By means of the nuts 4 the spokes may be given either a tensile or a compressing strain. A tensile strain is, however, preferred. The nuts have a bearing for a tensile strain on the inner surface of the flange 2, and for a compressing-strain on the projections 5.

I claim as my invention—

The combination, in a wheel, of the hub 1, provided with the flanges 2 2, having the spoke-holes therein, the series of projections 5, arranged within said flanges and adapted to receive the ends of the spokes between them, the spokes 3, and the nuts 4, arranged upon said spokes between said projections 5 and the inner walls of the flanges 2, substantially as described.

In testimony whereof I have hereunto set my hand this 26th day of March, 1886.

SAMUEL V. KENNEDY.

In presence of—
R. H. SANFORD,
A. C. PAUL.